March 23, 1965  H. O. SCHERENBERG  3,174,466
INTERNAL COMBUSTION ENGINE
Filed Feb. 2, 1961  2 Sheets-Sheet 1
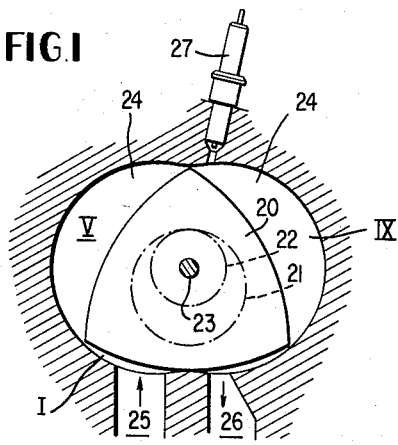
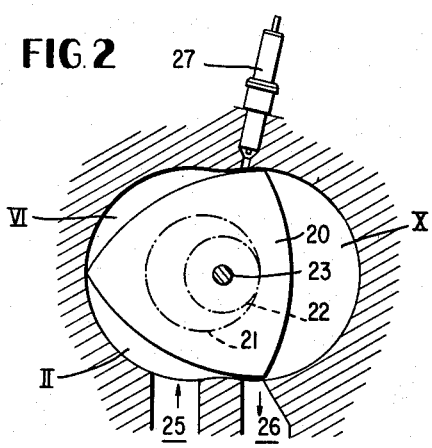
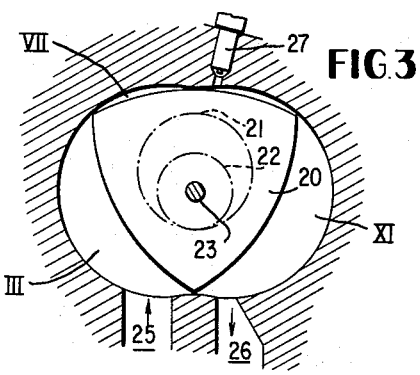
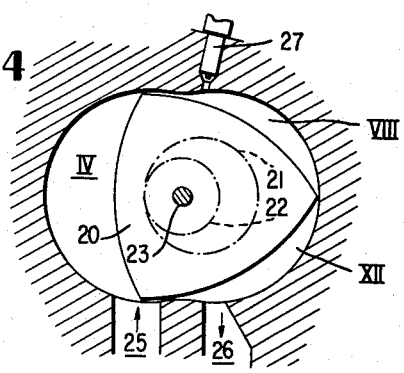
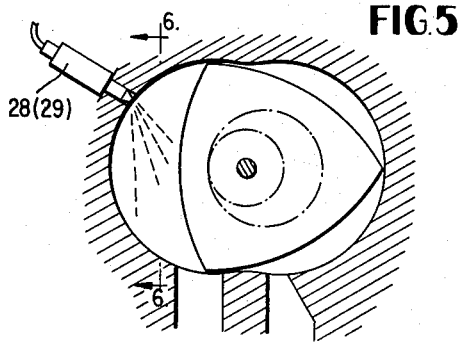
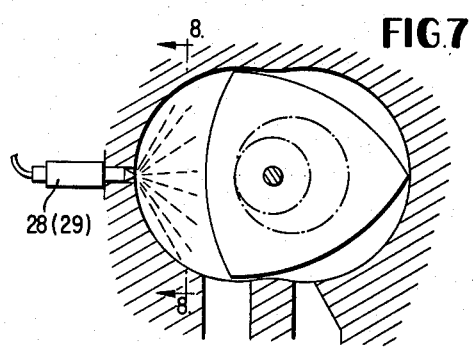
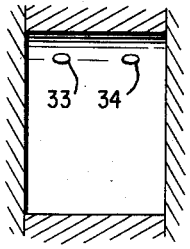
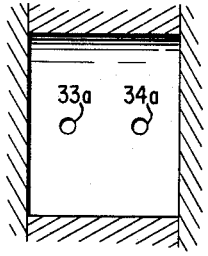
INVENTOR
HANS O. SCHERENBERG
BY *Dike, Craig & Freudenberg*
ATTORNEYS March 23, 1965  H. O. SCHERENBERG  3,174,466
INTERNAL COMBUSTION ENGINE
Filed Feb. 2, 1961  2 Sheets-Sheet 2
FIG.9  FIG.10  FIG.11
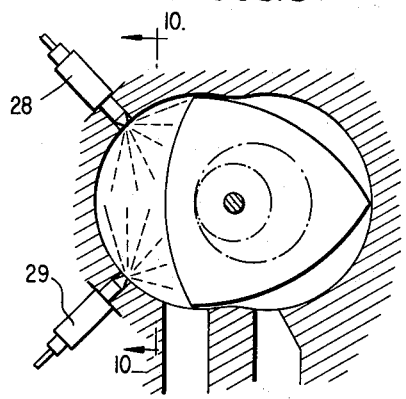 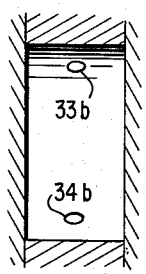 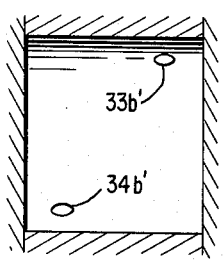
FIG.12  FIG.14
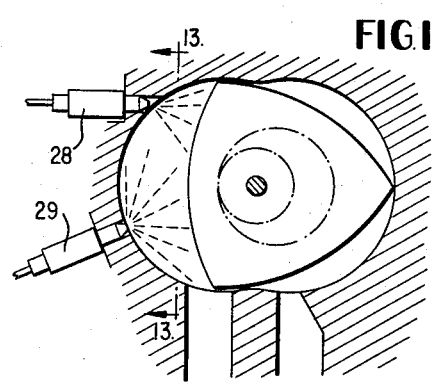 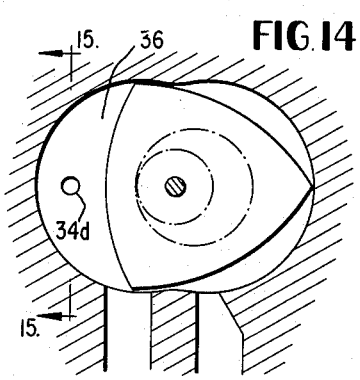
FIG.13  FIG.15
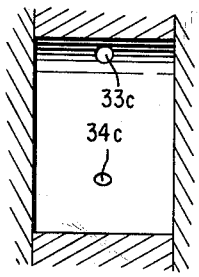 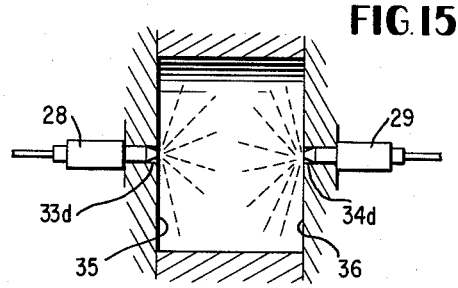
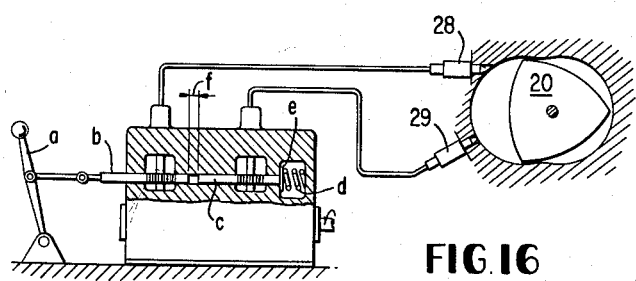
FIG.16
INVENTOR
HANS O. SCHERENBERG
BY *Dickey, Craig & Trendenberg*
ATTORNEYS

United States Patent Office 3,174,466
Patented Mar. 23, 1965

3,174,466
INTERNAL COMBUSTION ENGINE
Hans O. Scherenberg, Stuttgart-Heumaden, Germany, assignor to Daimler-Benz Aktiengesellschaft, Stuttgart-Unterturkheim, Germany
Filed Feb. 2, 1961, Ser. No. 86,736
Claims priority, application Germany, Feb. 4, 1960, D 32,520
7 Claims. (Cl. 123—8)

The present invention relates to a mixture-compressing internal combustion engine or gas engine of the injection type, and essentially consists in constructing the internal combustion engine as a rotary piston engine of a construction known per se, especially as a rotary piston engine controlling the alternations or change of the charge by the rotary piston itself, which is provided with two or more injection nozzles per working space.

The proposal to construct a mixture-compressing or gas internal combustion engine as a rotary piston engine provided with control means for the change of the charge by the rotary piston itself entails, in addition to the advantage of combining the favorable characteristics of the gasoline injection with the advantages of a rotary engine, the further significant advantage that at least no fuel is lost in the presence of the for the most part practically unavoidable flow losses of the fresh air direct in the exhaust line or manifold as would be the case with carburetor operation.

Moreover, the working spaces of the rotary piston engine are for the most part relatively elongated in the circumferential direction of the rotary piston movement and often times have a relatively large dimension also in the direction of the rotary piston axis. However, by the use of an arrangement of two injection nozzles in accordance with the present invention it is possible to attain a satisfactory mixture formation notwithstanding the unfavorable shape of the working space which is unfavorable for an even mixture formation.

Depending on the spatial requirements, the two nozzles of the injection system according to the present invention may be arranged one behind the other as viewed either in the axial direction of the rotary piston or as viewed in the circumferential direction thereof. However, a staggered arrangement of the injection nozzles may also be favorable with a view to as good as possible a distribution of the fuel over the entire working air.

If one or both of the nozzles are arranged in the end walls of the working space of the engine, a good preparation of the fuel jets may be achieved by the fact that the jets of the individual nozzles cross each other or are directed essentially against one another so as to impinge against one another.

Additionally, the arrangement in accordance with the present invention of two injection nozzles makes it possible to improve the operating characteristics during partial loads. For in order to assure even with partial loads a still sufficiently good atomization at the nozzles, it is proposed in accordance with the present invention during such operating conditions that one of the nozzles is turned off or cut off. Then the relatively small fuel quantity has to pass through a single nozzle so that it is possible to obtain relatively good atomization conditions thereat.

Furthermore, with the aid of an arrangement of two injection nozzles according to the present invention, a stratification of the charge during partial loads may be realized by so arranging and constructing that nozzle which is not turned off during partial loads that the latter injects the fuel charge into that region of the working air which comes to lie in proximity to the spark plug. It is thereby possible to operate with a very lean fuel mixture, which, considered from an overall point of view, lies already below the ignition limit. The operation is thereby rendered possible by reason of the fact that an enriched zone is effectively created within proximity of the spark plug.

Accordingly, it is an object of the present invention to provide a gasoline injection type internal combustion engine, especially of the rotary piston type which avoids and effectively eliminates the disadvantages encountered with the prior art constructions.

Another object of the present invention resides in an internal combustion engine adapted to operate at high rotary speeds which permits a practical realization of the advantages of the gasoline injection system with a minimization of fuel losses.

It is another object of the present invention to provide an injection system for the fuel supply of a rotary piston gasoline type engine which effectively eliminates the disadvantages that would normally be encountered in connection therewith by reason of the dimensions of the working space in rotary piston engines, particularly as regards the dimensions of the working spaces of such engines in the circumferential direction thereof.

Still another object of the present invention resides in the provision of a fuel injection system for a rotary piston engine which permits the realization of a satisfactory mixture formation notwithstanding the relatively unfavorable dimensions and contours of the working spaces normally used and necessitated with rotary piston engines.

Still a further object of the present invention is the provision of an injection system which makes possible a good distribution of the fuel injected into the working space over the entire combustion air.

A further object of the present invention resides in an injection system for rotary piston engines which improves the operating characteristics thereof during partial loads.

Another object of the present invention lies in the provision of a multi-nozzle injection system for rotary piston engines which renders possible the utilization of a stratification of the charge during partial loads to thereby improve the operating characteristics of the engine under such conditions.

These and other objects, features and advantages of the present invention will become more obvious from the following description, when taken in connection with the accompanying drawing which shows, for purposes of illustration only, several embodiments in accordance with the present invention, and wherein FIGURES 1 through 4 are schematic partial cross sectional views, taken at right angle to the piston axis of a prior art carburetor-type rotary piston internal combustion engine, illustrating the successive positions thereof, FIGURE 5 is a schematic partial cross sectional view, similar to FIGURE 4 and showing one embodiment of a rotary piston engine in accordance with the present invention;

FIGURE 6 is a schematic partial cross sectional view taken along line 6—6 of FIGURE 5 and providing an inside elevational view of the circumferential wall portions of the working space with a schematic indication of the nozzle orifices;

FIGURE 7 is a schematic partial cross sectional view, similar to FIGURE 5 of a modified embodiment in accordance with the present invention;

FIGURE 8 is a schematic partial cross sectional view taken along line 8—8 of FIGURE 7 and providing an inside elevational view of the circumferential wall portions of the working space with a schematic indication of the nozzle orifices;

FIGURE 9 is a schematic partial cross sectional view, similar to FIGURES 5 and 7, of still a further modified embodiment in accordance with the present invention;

FIGURE 10 is a schematic partial cross sectional view taken along line 10—10 of FIGURE 9 and providing an inside elevational view of the circumferential wall portions of the working space with a schematic indication of the nozzle orifices;

FIGURE 11 is a partial cross sectional view similar to FIGURE 10 of a modified embodiment, showing a staggered arrangement of the nozzle orifices for an arrangement similar to that of FIGURES 9 and 10;

FIGURE 12 is a partial schematic cross sectional view, similar to FIGURES 5, 7 and 9 of still another modified embodiment in accordance with the present invention;

FIGURE 13 is a partial cross sectional view taken along line 13—13 of FIGURE 12, and providing an inside elevational view of the circumferential wall portions of the working space with a schematic indication of the nozzle orifices;

FIGURE 14 is a schematic partial cross sectional view, similar to FIGURES 5, 7, 9 and 12, of still a further modified embodiment in accordance with the present invention;

FIGURE 15 is a schematic partial cross sectional view taken along line 15—15 of FIGURE 14, and FIGURE 16 is a schematic view of a control system for use in accordance with the present invention.

While FIGURES 1 to 4 illustrate a known prior art carburetor type rotary piston engine in the sequential positions thereof, the present invention will be described more fully hereinafter by reference to the different embodiments of FIGURES 5 through 15 illustrating several modifications in accordance with the present invention, of which FIGURES 5, 7, 9, 12 and 14 illustrate cross sectional views corresponding to that of FIGURE 4 whereas FIGURES 6, 8, 10, 11, 13 and 15 are elevational views of the inside of the circumferential walls of the working space, indicating at the same time the location of the apertures in which are located the orifices of the nozzles, omitted in these figures for clarity's sake, of the injection system in accordance with the present invention.

Referring now to the drawing wherein like reference numerals are used throughout the various views to designate like parts, and more particularly to FIGURES 1 through 4, these figures show a rotary piston 20 of a rotary piston engine of known construction which, by means of an internal toothed arrangement 21 rolls off along the external teeth of stationary gear wheel 22 with which the internal teeth 21 are in meshing engagement. The movement of the rotary piston 20 is transmitted on through an eccentric disk arranged concentrically to the internal teeth 21 within the rotary piston 20 which eccentric disk is rigidly connected with the main shaft 23 of the engine. The working space is designated in FIGURES 1 through 4 by reference numeral 24 whereas reference numerals 25 and 26 designate the inlet and outlet channels which are valved or controlled by the rotary piston 20 itself. The spark plug is designated in these figures by reference numeral 27. The passage of a working volume of air, in the successive locations thereof, may be followed by reference to the numerals I through XII which illustrate the sequential displacement of the air volume. Since the construction and operation of this prior art engine is known per se, a detailed description thereof is dispensed with herein, especially as it forms no part of the present invention.

FIGURES 5 and 6 illustrate a first embodiment of the arrangement of two injection nozzles 28 and 29 in accordance with the present invention of which only nozzle 28 is visible in FIGURE 5. The nozzles 28 and 29 of FIGURES 5 and 6 are disposed one behind the other in the axial direction of the engine and located within the part of the suction space remote from the inlet as indicated by the openings 33 and 34 (FIGURE 6) provided therefor in the circumferential wall of the working space. The nozzles inject in the direction against the air movement which results in a good mixture.

The arrangement of two nozzles entails, as may be readily seen from FIGURE 6, a good distribution of the fuel over the axial depth of the working space.

Similar considerations apply to the embodiment illustrated in FIGURES 7 and 8 in which the two nozzles 28 and 29 are arranged approximately in the center of the suction space as indicated by apertures 33a and 34a (FIGURE 8) and therefore are designed to inject through a very wide injection jet or cone.

FIGURES 10 and 11 show, respectively, a very simple and a staggered arrangement of the two nozzles 28 and 29 which may be used to advantage with the arrangement of FIGURE 9. The apertures for the nozzle are designated thereby by reference numerals 33b and 34b (FIGURE 10) and 33b' and 34b' (FIGURE 11). The arrangement of FIGURE 11 is of particular advantage if the axial depth of the working space attains a relatively larger value and, additionally, a space, as viewed in cross section, such as illustrated in FIGURE 9, is relatively oblong or elongated.

Of the two nozzles 28 and 29 illustrated in FIGURES 12 and 13, which are accommodated within the apertures 33c and 34c, respectively, the nozzle 28 is designed and constructed so as to inject at all times whereas the nozzle 29 is adapted to be cut off within the lower partial-load range by any suitable means. For that purpose, any suitable control means may be used known per se in the prior art. The relatively small partial-load fuel quantity is, therefore, conducted only through a single nozzle within such partial load range, and can be subjected thereat to relatively good atomization. Additionally, the nozzle 28 injects into the upper angular portion of the suction space so that the mixture is more rich thereat than in the lower portion of the suction space within the vicinity of the suction line 25. After the termination of the compression, i.e., corresponding to the position of FIGURE 3, the rich zone is located within proximity of the spark plug and ignites whereas the relatively lean zone which is not capable of ignition is located within the lower left partial space, namely in that part to which reference numeral VII is applied. If the rich zone begins to burn, of course the lower relatively lean zone is also affected thereby and the fuel disposed therein is also subject to combustion.

FIGURES 14 and 15 illustrate an arrangement according to which the nozzles are arranged in apertures 33d and 34d provided in both end walls 35 and 36 and inject in the direction toward each other.

FIGURE 16 illustrates schematically a control system for cutting off one of the two nozzles in the partial load range.

In FIGURE 16, the adjusting lever, for example, a gas pedal or gas lever is designated by reference character $a$. The gas lever $a$ is positively connected, in any suitable manner with the control rack $b$ of the first plunger of the injection pump which is operative to selectively adjust the quantity of injected fuel to be supplied by the continuously injecting nozzle 28. The control rack $c$ of a second plunger which selectively adjusts the amount of fuel injected by nozzle 29, i.e., by the nozzle which does not inject any fuel during partial loads, is kept normally in the rest position thereof by means of a compression spring $d$ with the aid of a suitable abutment $e$ mounted on the control rack $c$. It is only after the nozzle 28 already injects a predetermined quantity of fuel and the initial distance $f$ between the control racks $b$ and $c$ is overcome that the control rack $c$ is taken along during movements of the control rack $b$ toward the right as viewed in FIGURE 16. Since all of the elements shown in FIGURE 16 are of conventional construction known in the prior art, a detailed description thereof is dispensed with herein.

While I have shown and described several embodiments in accordance with the present invention, it is understood that the same is not limited thereto but is susceptible of many changes and modifications within the spirit and scope thereof and I, therefore, do not wish to be limited to the details shown and described herein nor to any particular type of rotary piston system but intend to cover all such changes and modifications as are encompassed by the scope of the appended claims.

I claim:

1. A mixture-compressing internal combustion engine of trochoidal construction and of the injection type, comprising housing means having internal surfaces forming a working space, polygonal rotary piston means within said working space, inlet and outlet means leading to and from said working space, means for rotating said polygonal piston means relative to said internal surfaces in such a manner that the corners of said piston means move along said internal surfaces and valve said inlet and outlet means by the rotary movements of said rotary piston means, spark plug means for said working space, and fuel injection means for the engine including two simultaneously operable injection nozzles for each working space of the engine, said two injection nozzles being spaced from one another in the circumferential direction of the internal surfaces of said housing means, one of said nozzles being disposed behind the other nozzle in the circumferential direction of said internal surfaces, as viewed in the direction of rotation of the rotary piston means, and the other nozzle being located more closely to said spark plug means, and means for injecting fuel through both of said nozzles simultaneously under normal operating conditions and for automatically turning off said one nozzle during partial loads while said other nozzle injects into the area of said working space which lies in proximity to said spark plug means.

2. A mixture-compressing internal combustion engine of trochoidal construction and of the injection type, comprising housing means having internal surfaces forming at least one working space, polygonal rotary piston means within said working space, inlet and outlet means leading to and from said working space, means rotating said polygonal piston means relative to said internal surfaces in such a manner that the corners of said piston means move along said internal surfaces and directly valve said inlet and outlet means by the rotary movements of said rotary piston means, spark plug means for working space and fuel injection means for the engine including two simultaneously operable injection nozzles for each working space of the engine, said nozzles being disposed one behind the other in the circumferential direction of the internal surfaces of said housing means, one of said nozzles being disposed behind the other nozzle in said circumferential direction, as viewed in the direction of rotation of the rotary piston means, and the other nozzle being located more closely to said spark plug means, and said nozzles being so arranged and constructed that the fuel jets issue therefrom simultaneously under normal operating conditions and in such directions as to provide a good preparation over substantially the entire portion of the working space into which fuel is injected, and means for selectively turning off said one nozzle within a predetermined partial load range.

3. In a mixture-compressing internal combustion engine of trochoidal construction in which a polygonal piston rotates within an engine housing having multi-arched internal surfaces and inlet and outlet means in said housing in such a manner that the corners of the piston move along said multi-arched internal surfaces and effectively valve said inlet and outlet means while also providing effectively a plurality of variable-volume working spaces corresponding in number to the number of piston corners which are effectively displaced in the rotary direction during rotary movements of the piston, the improvement essentially consisting of injection means including two simultaneously operable injection nozzles arranged in the internal surfaces of the housing and spaced from one another in the circumferential direction, the axes of the fuel jets issuing from said nozzles being approximately radially directed relative to the axes of the engine, and means for controlling the injection from said two nozzles in such a manner that under normal operating conditions fuel is injected simultaneously from both nozzles while under partial load operating conditions fuel is injected only through the nozzle which is disposed ahead of the other nozzle, as seen in the direction of relative rotation of the piston, said other nozzle being located more closely to said inlet means.

4. In a mixture-compressing internal combustion engine of trochoidal construction in which a polygonal piston rotates within an engine housing having multi-arched internal surfaces and inlet and outlet means in said housing in such a manner that the corners of the piston move along said multi-arched internal surfaces and effectively valve said inlet and outlet means while also providing effectively a plurality of variable-volume working spaces corresponding in number to the number of piston corners which are effectively displaced in the rotary direction during rotary movements of the piston, the improvement essentially consisting of injection means including two simultaneously operable injection nozzles arranged in the internal surfaces of the housing and spaced from one another in the circumferential direction, the axis of the fuel jet issuing from the first nozzle, as seen in the direction of rotation being approximately radially directed relative to the axis of the engine and the axis of the fuel jet of the second nozzle being directed nearly tangentially to the adjoining internal surface portion of the housing, and means for controlling the injection from said two nozzles in such a manner that under normal operating conditions fuel is injected from both nozzles substantially simultaneously.

5. In a mixture-compressing internal combustion engine of trochoidal construction in which a polygonal piston rotates within an engine housing having multi-arched internal surfaces and inlet and outlet means in said housing in such a manner that the corners of the piston move along said multi-arched internal surfaces and effectively valve said inlet and outlet means while also providing effectively a plurality of variable-volume working spaces corresponding in number to the number of piston corners which are effectively displaced in the rotary direction during rotary movements of the piston, the improvement essentially consisting of injection means including two simultaneously operable injection nozzles arranged in the internal surfaces of the housing and spaced from one another in the circumferential direction, and means for controlling the injection from said two nozzles in such a manner that under normal operating conditions fuel is injected simultaneously from both nozzles while under partial load operating conditions fuel is injected only through the nozzle which is disposed ahead of the other nozzle, as seen in the direction of relative rotation of the piston, said other nozzle being located more closely to said inlet means.

6. In a mixture-compressing internal combustion engine of trochoidal construction in which a polygonal piston rotates within an engine housing having multi-arched internal surfaces and inlet and outlet means in said housing in such a manner that the corners of the piston move along said multi-arched internal surfaces and effectively valve said inlet and outlet means while also providing effectively a plurality of variable-volume working spaces corresponding in number to the number of piston corners which are effectively displaced in the rotary direction during rotary movements of the piston, the improvement essentially consisting of injection means including two simultaneously operable injection nozzles arranged in the internal surfaces of the housing and spaced from one another in the circumferential direction, the axes of the fuel jets issuing from said nozzles being approximately radially directed relative to the axes of the engine, and means for controlling the injection from said two nozzles in such a manner that under normal operating conditions fuel is injected simultaneously from both nozzles while under partial load operating conditions fuel is injected only through the one nozzle which is disposed in front of the other nozzle, as seen in the direction of relative rotation of the piston, said other nozzle being located more closely to said inlet means.

7. In a mixture-compressing internal combustion engine of trochoidal construction in which a polygonal piston rotates within an engine housing having multi-arched internal surfaces and inlet and outlet means in said housing in such a manner that the corners of the piston move along said multi-arched internal surfaces and effectively valve said inlet and outlet means while also providing effectively a plurality of variable-volume working spaces corresponding in number to the number of piston corners which are effectively displaced in the rotary direction during rotary movement of the piston, the improvement essentially consisting of injection means including two simultaneously operable injection nozzles arranged in the internal surfaces of the housing and spaced from one another in the circumferential direction, the axis of the fuel jet issuing from the first nozzle, as seen in the direction of rotation being approximately radially directed relative to the axis of the engine and the axis of the fuel jet of the second nozzle being directed nearly tangentially to the adjoining internal surface portion of the housing, and means for controlling the injection from said two nozzles in such a manner that under normal operating conditions fuel is injected from both nozzles substantially simultaneously while under partial load operating conditions fuel is injected only through the second nozzle, as seen in the direction of relative rotation of the piston.

References Cited in the file of this patent
UNITED STATES PATENTS

| | | |
|---|---|---|
| 1,434,446 | McQueen | Nov. 7, 1922 |
| 1,464,268 | Keller | Aug. 7, 1923 |
| 2,302,254 | Rhine | Nov. 17, 1942 |
| 2,612,879 | Hibbard | Oct. 7, 1952 |
| 2,640,422 | Malin | June 2, 1953 |
| 2,947,290 | Froede | Aug. 2, 1960 |
| 2,966,898 | Rydberg et al. | Jan. 3, 1961 |
| 2,988,065 | Wankel et al. | June 13, 1961 |

FOREIGN PATENTS

| | | |
|---|---|---|
| 734,001 | Germany | Apr. 7, 1943 |